United States Patent
Witten et al.

(10) Patent No.: US 9,135,647 B2
(45) Date of Patent: Sep. 15, 2015

(54) METHODS AND SYSTEMS FOR FLEXIBLE AND SCALABLE DATABASES

(75) Inventors: David Witten, Arlington, VA (US); Ian Klein, Hatfield (GB)

(73) Assignee: Amdocs Software Systems Limited, Dublin (IE)

(*) Notice: Subject to any disclaimer, the term of this patent is extended or adjusted under 35 U.S.C. 154(b) by 393 days.

(21) Appl. No.: 13/525,405

(22) Filed: Jun. 18, 2012

(65) Prior Publication Data

US 2013/0339293 A1 Dec. 19, 2013

(51) Int. Cl.
*G06F 7/00* (2006.01)
*G06F 17/00* (2006.01)
*G06Q 30/04* (2012.01)
*G06F 17/30* (2006.01)

(52) U.S. Cl.
CPC .......... *G06Q 30/04* (2013.01); *G06F 17/30067* (2013.01); *G06F 17/30286* (2013.01); *G06F 17/30345* (2013.01); *G06F 17/30557* (2013.01)

(58) Field of Classification Search
CPC ................. G06F 17/30286; G06F 17/30067
See application file for complete search history.

(56) References Cited

U.S. PATENT DOCUMENTS

2009/0138437 A1* 5/2009 Krishnamoorthy et al. ...... 707/3
2012/0323867 A1* 12/2012 He et al. .......................... 707/693

* cited by examiner

*Primary Examiner* — Loan T Nguyen
(74) *Attorney, Agent, or Firm* — Finnegan, Henderson, Farabow, Garrett & Dunner LLP (57) ABSTRACT

Methods and systems for utilizing a database are disclosed. The methods and systems determine a key representative of a storage location of first RDF data in a NoSQL database. In addition, the methods and systems read the first RDF data in the NoSQL database using the key. The methods and systems also write second RDF data derived from the first RDF data into a second database stored in memory. The methods and systems may also modify the second RDF data, and write third RDF data derived from the modified second RDF data into the NoSQL database.

12 Claims, 9 Drawing Sheets

| Keys | Values |
|---|---|
| Customer1:billing_perm | compressed_graph1 |
| Customer1:billing_hist1 | compressed_graph2 |
| Customer1:billing_hist2 | compressed_graph3 |
| Customer1:usage_perm | compressed_graph4 |
| Customer1:usage_hist | compressed_graph5 |
| Customer2:billing_perm | compressed_graph6 |
| Customer2:billing_hist1 | compressed_graph7 |
| Customer2:billing_hist2 | compressed_graph8 |
| Customer2:usage_perm | compressed_graph9 |
| Customer2:usage_hist | compressed_graph10 |

METHODS AND SYSTEMS FOR FLEXIBLE AND SCALABLE DATABASES

TECHNICAL FIELD

The present disclosure relates to the field of database flexibility and scalability and, more particularly, methods and systems for utilizing NoSQL and the Resource Description Framework (RDF) to achieve database flexibility and scalability.

BACKGROUND

The Resource Description Framework (RDF) is a standard model for data interchange on the Internet. RDF allows for data expressions to be made in the form of triples. An RDF triple contains three components: a subject, a predicate, and an object. A subject in an RDF triple indicates what resource is described by the triple. A predicate in an RDF triple indicates characteristics of the resource, and may provide a relationship between the resource and the object of the RDF triple. For example, in the context of customer billing, the subject in an RDF triple could be an account, the predicate in the RDF triple could be an account balance, and the object in the RDF triple could be a numerical value reflecting a customer's account balance. By using this model, a database of RDF triples can be maintained that can be processed and shared across different applications. In addition, RDF databases have indices that relate resources to the triples for which the resources are subjects, predicates, or values. As such, complex queries can be made against an RDF database. However, because of the need to maintain a large number of indices and triples, RDF databases have traditionally suffered from a lack of scalability.

NoSQL databases are databases not based on the Structured Query Language (SQL). NoSQL databases can be designed to be linearly scalable by using several servers where data is distributed and replicated among the servers. Linearly scalable NoSQL databases typically access data using a primary key, which may be composed of one or more sub-keys (e.g., a row key and column key). In a key-value database, a key is used to look up a corresponding value, or "cell," that can contain data.

In order to increase flexibility, NoSQL databases are sometimes arranged as two-dimensional tabular databases that are looked up using both a row key and a column key. That is, the primary key in a two-dimensional tabular database may comprise a row key and a column key. Looking up data in a two-dimensional tabular database typically requires either access to both a row key and column key that correspond to target data, or access to one of the row and column keys combined with a requirement to scan a substantial portion of the database. However, maintaining a plurality of indices while ensuring the indices are consistent with the indexed data may be costly in terms of performance. In order to ease index maintenance, applications that utilize typical two-dimensional tabular NoSQL databases will often be limited to a small number of indices, limiting the variety of queries that can be efficiently executed. In addition, the traditional linearly scalable NoSQL databases do not permit queries that join several pieces of data from different locations. Thus, while NoSQL databases may be implemented to be linearly scalable, NoSQL databases traditionally suffer from a lack of flexibility.

SUMMARY

In one disclosed embodiment, a method for utilizing a database is disclosed. The method comprises determining a key representative of a storage location of first RDF data in a NoSQL database. In addition, the method comprises reading the first RDF data in the NoSQL database using the key. In addition, the method comprises writing second RDF data derived from the first RDF data into a second database stored in memory. The method also comprises modifying the second RDF data and writing third RDF data derived from the modified second RDF data into the NoSQL database.

In another disclosed embodiment, a system for utilizing a database is disclosed. The system comprises a processor, a memory, and program code stored in the memory. The program code stored in the memory, when executed by the processor, causes the system to perform the steps of determining a key representative of a storage location of first RDF data in a NoSQL database, reading the first RDF data in the NoSQL database using the key, writing second RDF data derived from the first RDF data into a second database stored in memory, modifying the second RDF data, writing third RDF data derived from the modified second RDF data into the NoSQL database.

Additional aspects related to the embodiments will be set forth in part in the description which follows, and in part will be obvious from the description, or may be learned by practice of the invention.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
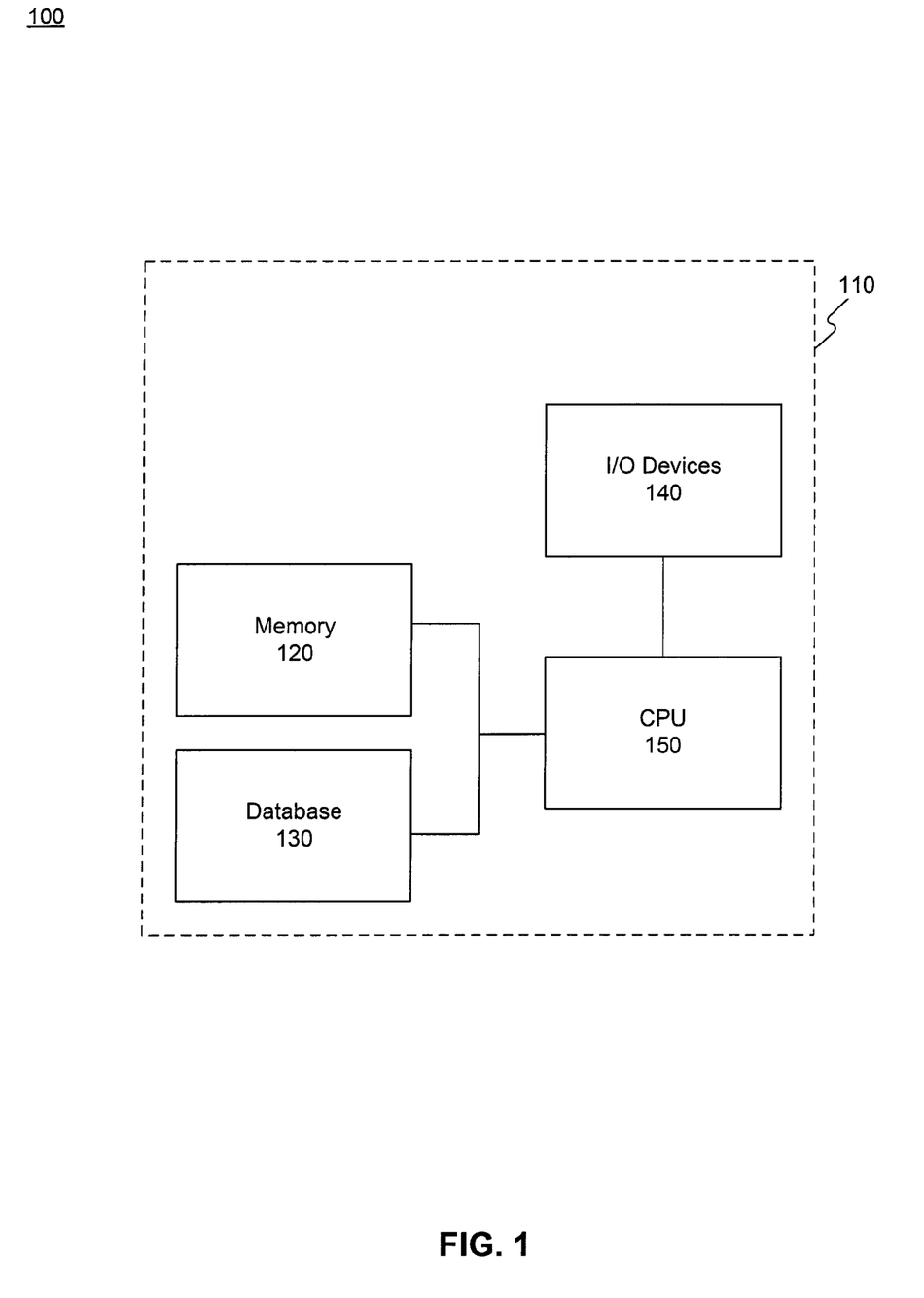
FIG. 1 illustrates an example system that may be used for implementing the disclosed embodiments.

FIG. 1 is a diagram illustrating an example computer system 100 that may be used for implementing the disclosed embodiments. Computer system 100 may include one or more computers 110, which may be servers, personal computers, and/or other types of computing devices. Computer 110 may include, among other things, one or more of the following components: a central processing unit (CPU) 150 configured to execute computer program code to perform various processes and methods, including the embodiments herein described; memory 120, such as RAM, EEPROM, and flash memory, to store data and computer program code; database 130 to store tables, lists, or other data structures; and I/O devices 140 such as a keyboard, mouse, and monitor. Each of these components is well-known in the art and will not be discussed further.

Figure 2:
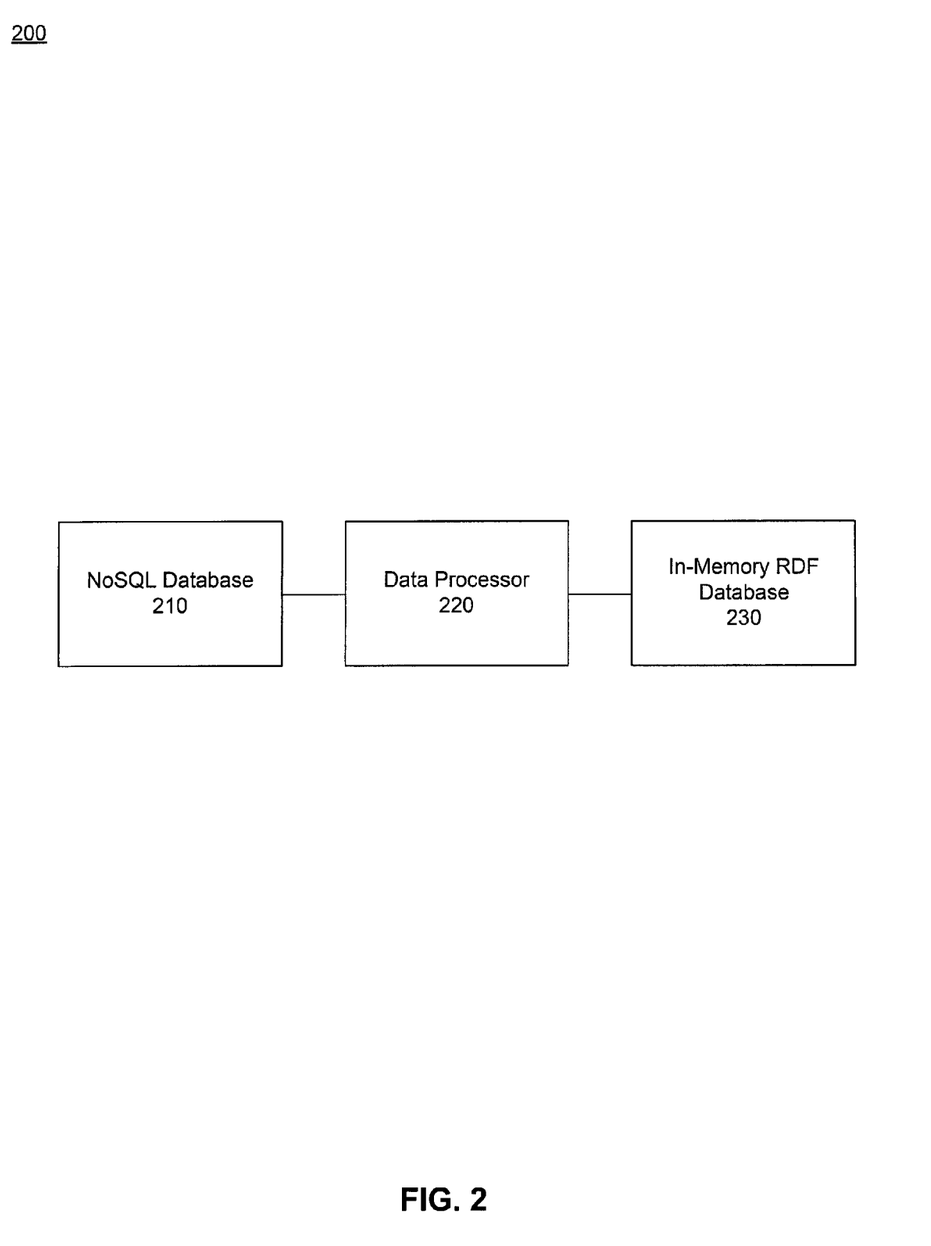
FIG. 2 illustrates an example system that may be used for storing and processing data.

FIG. 2 illustrates an example hybrid system 200 that may be used for storing and processing data. System 200 may include a NoSQL database 210, a data processor 220, and an in-memory RDF database 230. The NoSQL database 210, which may be a database 130, stores data in a key-value format. In some embodiments, data is replicated in the NoSQL database 210 such that one or more copies of a given key-value are stored over one or more servers. The key of a key-value provides an indication of where the value is stored. For example, in embodiments that are used for customer service, the key may be a customer identification number. In addition, the key may be representative of a plurality of sub-keys (e.g., a row key and column key). It will be appreciated that the NoSQL database 210 may store a plurality of key-values, not all of which necessarily being processed at a given time.

The in-memory RDF database 230, which may be memory 120, stores RDF data such as RDF triples. In some embodiments, RDF triples may be grouped into sets known as RDF graphs. In some embodiments, RDF graphs may be further grouped into sets known as sub-topics. In addition, in some embodiments, sub-topics may be further grouped into sets known as topics. For example, where an RDF triple represents a certain value associated with a customer, an RDF graph may store a set of RDF triples for a customer based on how frequently the RDF triples are needed (e.g., one RDF graph may store RDF triples used on a daily basis and another RDF graph may store RDF triples that are rarely used). In addition, a sub-topic may store RDF graphs associated with a particular customer (e.g., one sub-topic may store RDF graphs associated with one customer and another sub-topic may store RDF graphs associated with another customer). A topic may store several sub-topics associated with a certain group of customers. Various other arrangements of building graphs, sub-topics or topics may be implemented depending on the application for which RDF data is being used.

In some embodiments, the NoSQL database 210 may be a two-dimensional tabular database comprising cells that are compressed RDF graphs. Compressed RDF graphs in rows may be sorted based on their prefixes. In some embodiments, RDF graphs that are part of the same topic may be placed in the same row, and RDF graphs that are part of the same sub-topic may be given the same prefix so that they are sorted to be next to each other within the row. However, it will be appreciated that the NoSQL database may store RDF data using a variety of other arrangements, such as by storing compressed sub-topics or topics in the cells of a non-tabular key-value NoSQL database. In addition, in some embodiments, the NoSQL database may contain a mixture of different types of key-values.

The data processor 220, such as CPU 150, enables data to be exchanged between the NoSQL database 210 and the in-memory RDF database 230. In addition, data processor 220 may perform operations on and modify data in the NoSQL database 210 and data in the in-memory RDF database 230.

Figure 3:
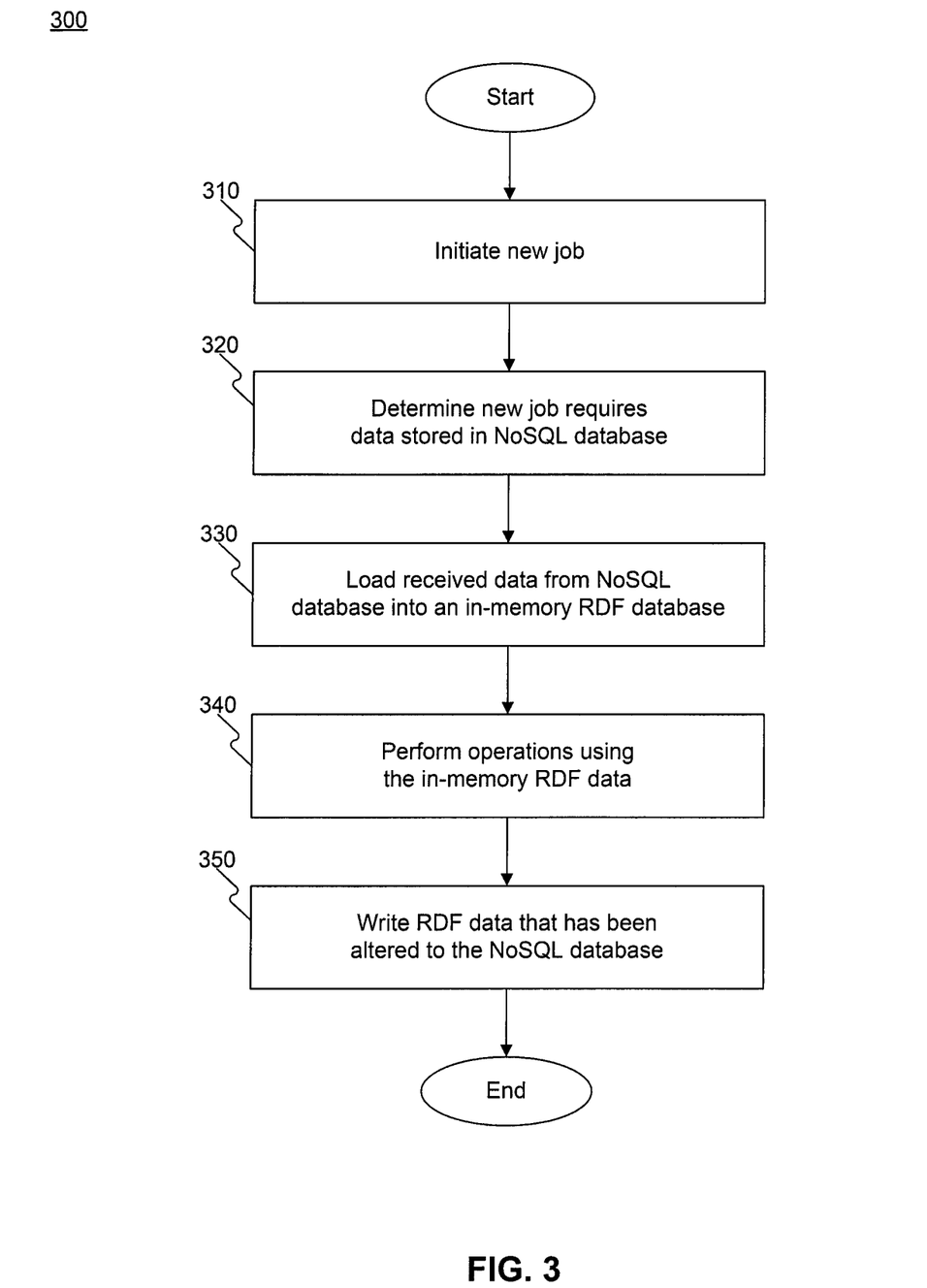
FIG. 3 illustrates an example method for utilizing a NoSQL database and an in-memory RDF database to process data.

FIG. 3 depicts a method 300 for utilizing a NoSQL database and an in-memory RDF database to process data. Method 300 begins by initiating a new job (step 310). While in some embodiments only a single job will be handled at a given time, in other embodiments a plurality of jobs may be initiated and handled simultaneously. A new job determination may occur responsive to receiving a spontaneous job request, such as a new customer bill being received that requires processing, or may occur responsive to a scheduled time arriving (e.g., a job to analyze a customer's account may be initiated once a month).

Once a new job is initiated, a determination will be made that the new job requires data that is stored in a NoSQL database, such as NoSQL database 210 (step 320). Upon such a determination, the method will load the required data from the NoSQL database into an in-memory RDF database, such as in-memory RDF database 230 (step 330). In order to load data from the NoSQL database, the method 300 may require a key. In some embodiments, a key indicative of the required key-value data may be obtained with, or derivable from, the information obtained when a new job is initiated. If the data in the NoSQL database is compressed, the data will be uncompressed when it is loaded into the in-memory RDF database. In particular, the data may be uncompressed before being added to the in-memory RDF database.

Once the data necessary to perform the job has been loaded into the in-memory RDF database, the data is analyzed and processed (step 340). The analysis and processing may be performed with a processor, such as CPU 150. One advantage of performing operations on the data in the in-memory RDF database is that the data can be analyzed and processed with increased flexibility and speed. For example, rather than finding data using keys, data in the in-memory RDF database can be accessed utilizing the tabular nature of the RDF database. In addition, the in-memory RDF database can accept complex queries that utilize interrelated nature of RDF triples. While the in-memory RDF database is more limited in scalability than the NoSQL database, by restricting the in-memory RDF database to data regarding a limited number of jobs, the size constraints of an in-memory database will not typically limit the functionality of an application using the RDF database.

Once the data has been analyzed and processed, any data that has been changed is stored in the NoSQL database (step 350). For example, if an RDF triple that is part of a given RDF graph is replaced, the RDF triples in the given RDF graph may be compressed and stored as a cell in the NoSQL database. In some instances, the changed RDF triple will belong to a compressed RDF graph that was previously stored in the NoSQL database. In such instances, the newly created compressed RDF graph will replace the previously stored compressed RDF graph in the NoSQL database. However, the changed RDF triple may also belong to a newly formed RDF graph such that a new key-value will be created. It will also be appreciated that a plurality of RDF triples may be changed in step 340, and that, in such instances, one or more RDF graphs associated with the plurality of changed RDF triples may be compressed and stored in the NoSQL database in step 350.

Figure 4:
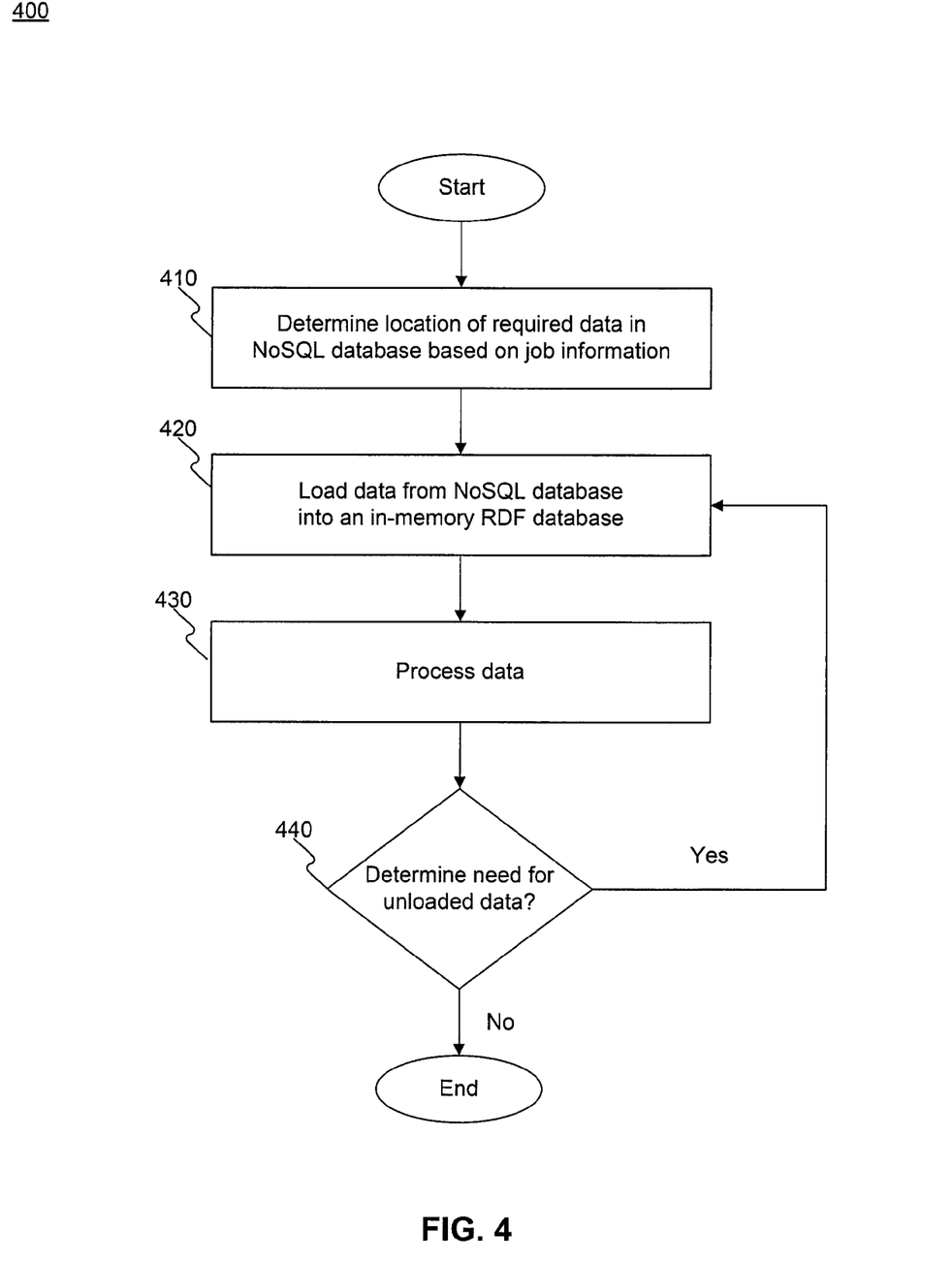
FIG. 4 illustrates an example method for loading data into an in-memory RDF database from a NoSQL database.

FIG. 4 depicts a method 400 for loading data into an in-memory RDF database from a NoSQL database. Method 400 begins by determining the location of required data in a NoSQL database based on received job information (step 410). For example, if the job pertains to a particular customer, the method 400 may determine a key for the NoSQL database based on the customer ID. Upon determining the storage location of required data, the data will be loaded into an in-memory RDF database (step 420). In some embodiments, steps 410-420 may be skipped if an earlier job has caused the required data to be loaded into the in-memory RDF database without having yet been removed from the RDF database.

Once the RDF data has been loaded into the RDF database, the data may begin to be processed (step 430). However, in the course of processing the data, a query to the in-memory RDF database may access a reference to some data that has not yet been loaded into the in-memory RDF database (step 440). For example, a query may be made that access the identifier of an object while the object is not yet loaded. If such referenced not yet loaded data is found to exist, the method 400 will return to step 420, whereby the not yet loaded data will be read from the NoSQL database and loaded into the in-memory RDF database. In some embodiments, the location of the object may not be precisely known and so several attempts may be needed to load the object. However, in some embodiments, when an object references another object, the reference will also contain the address of the unit, such as a compressed RDF graph, containing the not yet loaded object. Steps 420-440 may be repeated one or more times as additional data for loading is found in the course of data processing.

Figure 5:
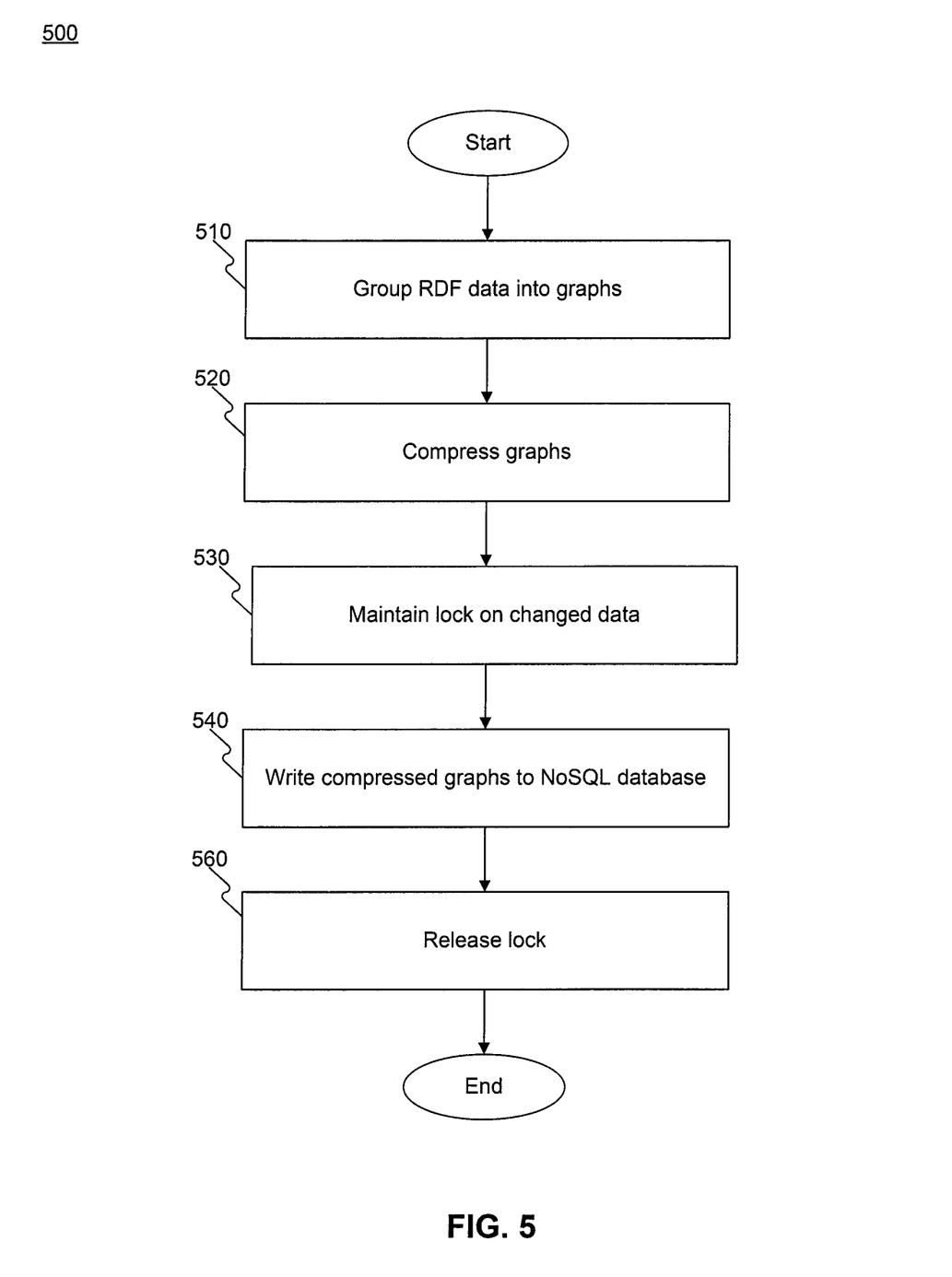
FIG. 5 illustrates an example method for writing data from an in-memory RDF database into a NoSQL database.

FIG. 5 depicts a method 500 for writing data from an in-memory RDF database into a NoSQL database. Method 500 begins by grouping RDF triples in the in-memory RDF database into graphs (step 510). Step 510 may be performed before data has been analyzed and processed, while data is being analyzed and processed, or after the data has been analyzed and processed. In addition, in some embodiments, some or all of the triples may already be grouped into graphs when they are loaded into the in-memory RDF database. In some embodiments, graphs may further be grouped into sub-topics and, in some embodiments, sub-topics may further be grouped into topics.

In preparation for storing the RDF data into the NoSQL database, the graphs are compressed (step 520). By compressing the graphs, the total storage requirements of the NoSQL database will be reduced. A lock may be maintained on the changed data while other data still needs to be processed (step 530). By placing a lock on the changed data, other applications that utilize the NoSQL database will be prevented from accessing the changed data until the full set of changes has been written. In some embodiments, a lock may be placed just before writing data to the NoSQL database to ensure consistency of data that is being updated. In some embodiments, a lock may be placed before reading data from the NoSQL database to ensure that every reader sees the latest data updates. The compressed graphs may be written to the NoSQL database (step 540). Once all of the required copies of the compressed graphs have been written to the NoSQL database, the lock placed on the changed data may be released (step 550).

Figure 6:
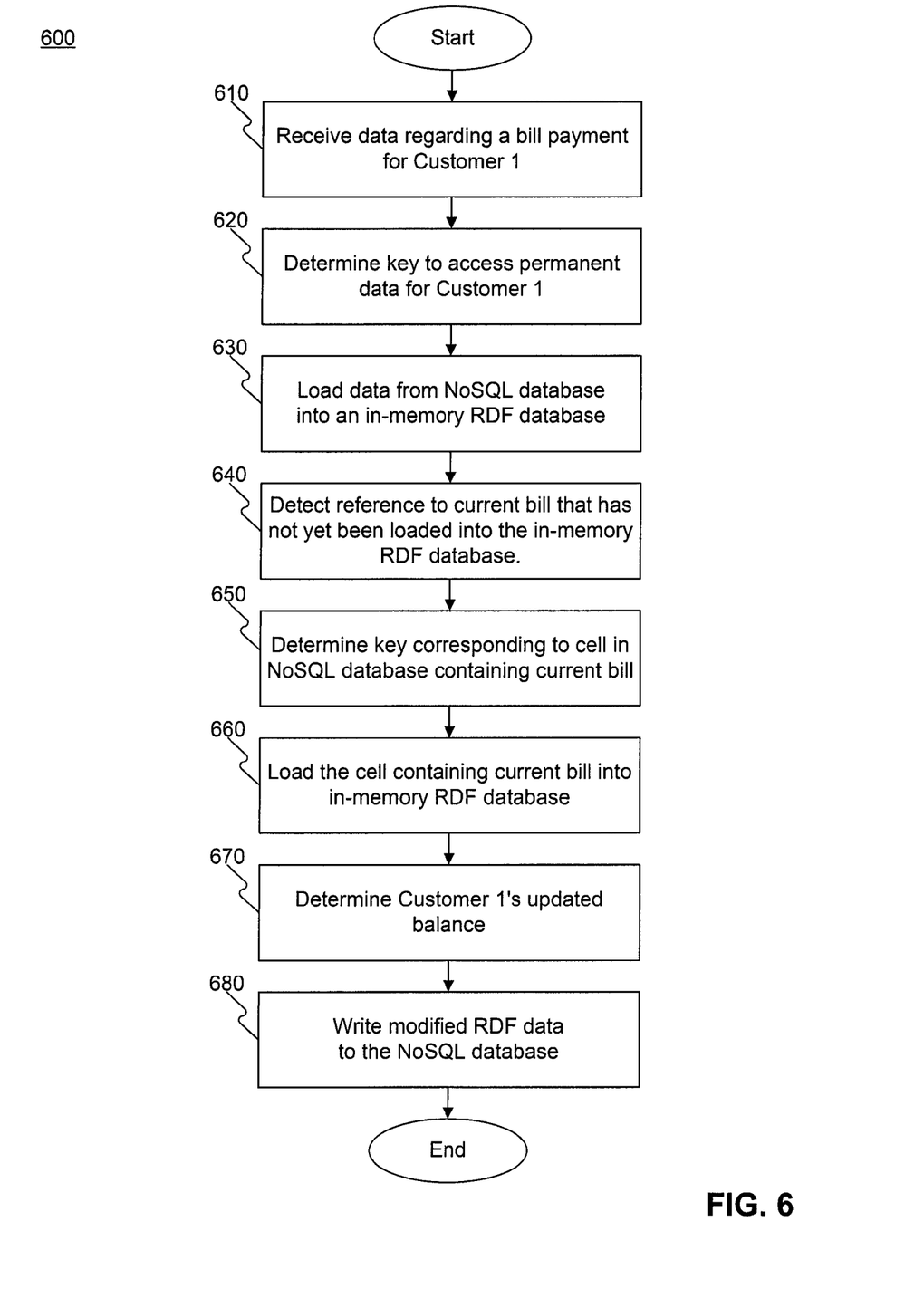
FIG. 6 illustrates an example method for utilizing a NoSQL database and an in-memory RDF database to process data.
Figure 7:
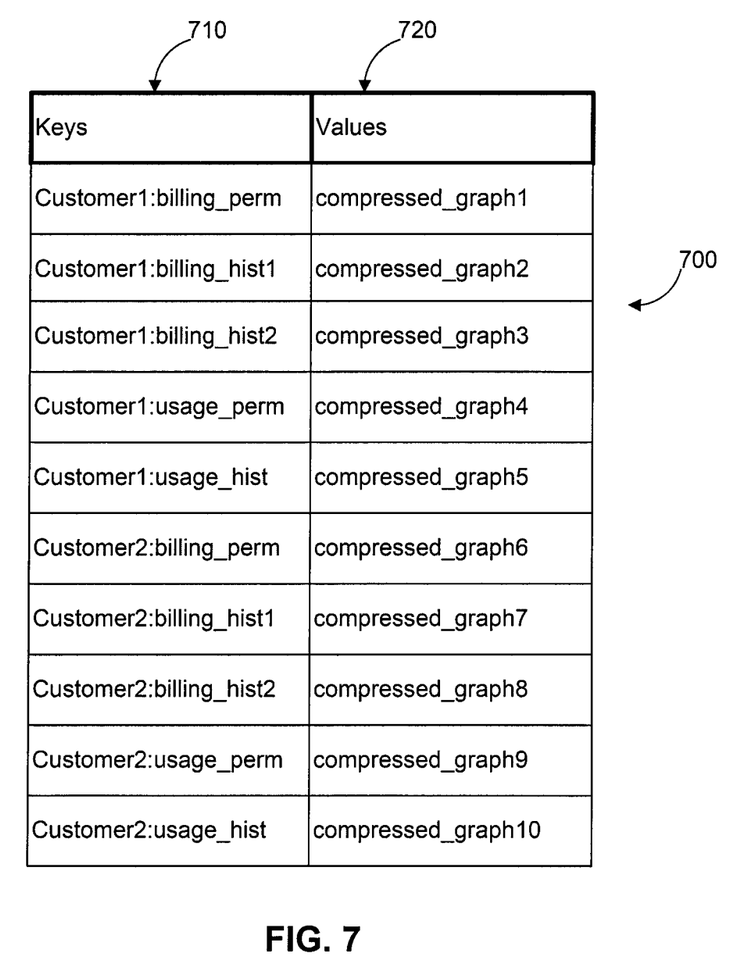
FIG. 7 illustrates an example NoSQL database.

FIG. 6 depicts an example method 600 for utilizing a NoSQL database and an in-memory RDF database to process a bill payment received for a customer. Method 600 begins when data pertaining to a new bill payment for Customer 1 is received (step 610). In accordance with method 600, a new bill payment may require several jobs to be performed, such as, for example, updating an account balance of Customer 1. One or more keys corresponding to one or more cells containing permanent data for Customer 1 in the NoSQL database may then be determined (step 620). An example of a NoSQL database is depicted in FIG. 7. In particular, FIG. 7 depicts a NoSQL database 700 having a plurality of keys 710 and a plurality of corresponding values 720. Thus, for example, the method may determine that the key "Customer1:billing_perm" corresponds with a cell containing permanent data for Customer 1. In the example depicted in FIG. 7, the keys are written in "row key:column key" format. That is, for example, for the key "Customer1:billing_perm", "Customer1" would be a row key, representative of a topic, and "billing_perm" would be a column key, where "billing" is representative of a sub-topic and "perm" is representative of a graph.

Figure 8:
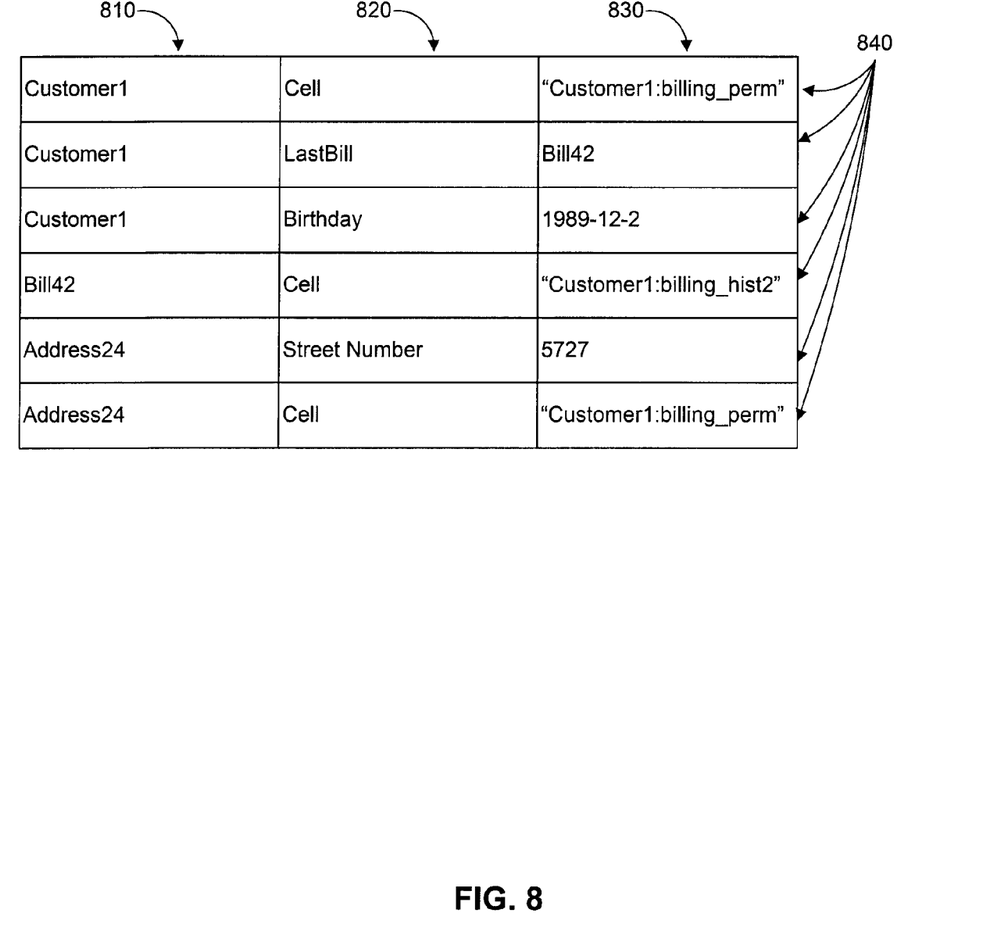
FIG. 8 illustrates an example in-memory RDF database.

Upon determining the key, such as Customer1: billing_perm, the method loads the corresponding cell, such as compressed_graph1, into an in-memory RDF database (step 630). Before loading the value into the in-memory RDF database, the value may be decompressed. FIG. 8 depicts an example in-memory RDF database. As depicted in FIG. 8, compressed_graph1 has been decompressed into a plurality of triples 840, comprised of subjects 810, predicates 820, and objects 830. As shown in FIG. 8, one of the triples may indicate that the last bill was Bill42. In addition, one of the triples may indicate that Bill42 has additional data stored in the cell "Customer1:billing_hist2". However, since only the graph Customer1:billing_perm has thus far been loaded into the in-memory RDF database, if a need arises for data regarding the last bill, a determination will be made that data is needed from the not yet loaded graph Customer1: billing_hist2 (step 640).

Figure 9:
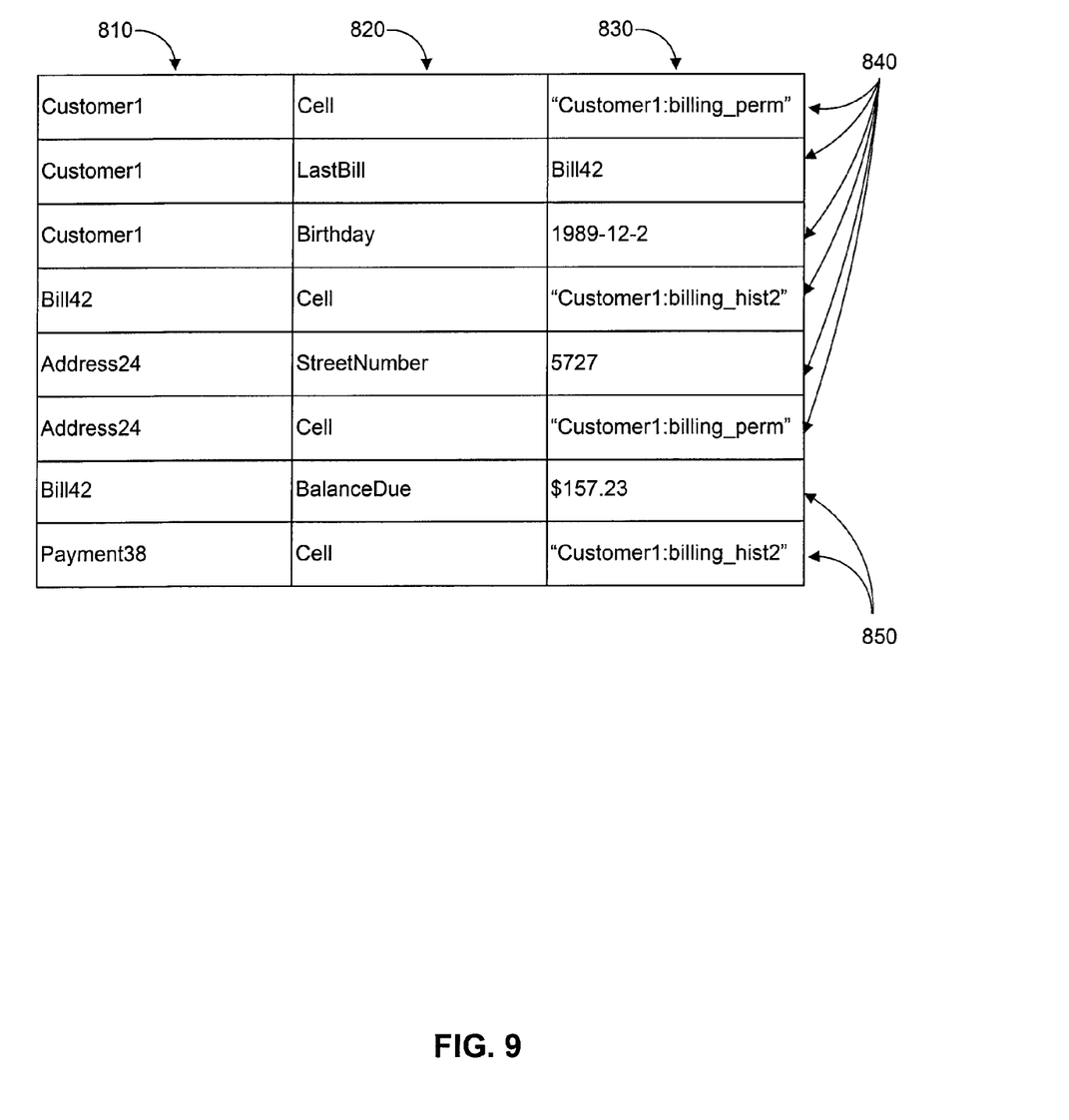
FIG. 9 illustrates an example in-memory RDF database.

The method 600 may then determine a key for the last bill in the NoSQL database, such as by, for example, utilizing the reference to Customer1:billing_hist2 as a key (step 650). The method then loads the corresponding cell, such as compressed_graph2, into the in-memory RDF database (step 660). FIG. 9 depicts an exemplary in-memory RDF database after the additional graph has been loaded. As depicted in FIG. 9, compressed_graph7 has been decompressed such that two additional triples 850 are present in the in-memory RDF database. However, as depicted in FIG. 9, the triples 840 from the permanent data remain available in the in-memory RDF database.

The method may then analyze the data in the in-memory RDF database, such as the BalanceDue from Bill42, to determine information regarding Customer 1's payment such as an updated balance (step 670). As depicted in FIG. 9, newly created RDF data based on the updated balance determination may stored with an object 810 of Payment 38 in graph Customer1:billing_hist2. Then, the method may write any modified RDF data to the NoSQL database (step 680).

Embodiments and all of the functional operations described in this specification can be implemented in digital electronic circuitry, or in computer software, firmware, or hardware, including the structures disclosed in this specification and their structural equivalents, or in combinations of them. Embodiments can be implemented as one or more computer program products, i.e., one or more modules of computer program instructions encoded on a computer readable medium, e.g., a machine readable storage device, a machine readable storage medium, a memory device, or a machine readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVDROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client/server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments have been described. Other embodiments are within the scope of the following claims.

What is claimed is:

1. A method for utilizing a Not Only Structured Query Language (NoSQL) database comprising one or more processors to perform the steps of:
   determining a key representing a storage location of first Resource Description Framework (RDF) data in the NoSQL database based on a new job initiation, wherein the first RDF data comprises compressed RDF data;
   reading the first RDF data in the NoSQL database using the key;
   writing second RDF data devised from the first RDF data into a second database stored in memory, wherein the second RDF data comprises uncompressed RDF data;
   modifying the second RDF data;
   writing third RDF data derived from the modified second RDF data into the NoSQL database;
   determining that the new job has been completed; and
   deleting the second RDF data or modified second RDF data from the second database.

2. The method of claim 1, wherein the first RDF data comprises a compressed RDF graph.

3. The method of claim 1, further comprising:
   determining that the second RDF data references not yet loaded RDF data not present in the second database.

4. The method of claim 3, further comprising:
   determining a key representative of a storage location of the not yet loaded RDF data in the NoSQL database;
   reading the not yet loaded RDF data in the NoSQL database using the key representative of the storage location of the not yet loaded RDF data in the NoSQL database;
   writing RDF data derived from the not yet loaded RDF data into the second database.

5. The method of claim 3, wherein the not yet loaded RDF data determination comprises a determination that an RDF triple in the second RDF data references an RDF resource whose triples are not in the second RDF data.

6. The method of claim 1, wherein writing the third RDF data comprises writing a plurality of copies of the third RDF data into the NoSQL database.

7. A system for utilizing a Not Only Structured Query Language (NoSQL) database, comprising:
   a processor;
   a memory;
   program code stored in the memory, which, when executed by the processor, causes the system to perform the steps of:

determining a key representing a storage location of first Resource Description Framework (RDF) data in the NoSQL database based on a new job initiation, wherein the first RDF data comprises compressed RDF data;

reading the first RDF data in the NoSQL database using the key;

writing second RDF data devised from the first RDF data into a second database stored in memory, wherein the second RDF data comprises uncompressed RDF data;

modifying the second RDF data;

writing third RDF data derived from the modified second RDF data into the NoSQL database;

determining that the new job has been completed; and deleting the second RDF data or modified second RDF data from the second database.

8. The system of claim 7, wherein the first RDF data comprises a compressed RDF graph.

9. The system of claim 7, wherein the program code stored in the memory further causes the system to perform the step of:

determining that the second RDF data references not yet loaded RDF data not present in the second database.

10. The system of claim 9, wherein the program code stored in the memory further causes the system to perform the steps of:

determining a key representative of a storage location of the not yet loaded RDF data in the NoSQL database;

reading the not yet loaded RDF data in the NoSQL database using the key representative of a storage location of the not yet loaded RDF data in the NoSQL database;

writing RDF data derived from the not yet loaded RDF data into the second database.

11. The system of claim 9, wherein the not yet loaded RDF data determination comprises a determination that an RDF triple in the second RDF data references an RDF resource whose triples are not in the second RDF data.

12. The system of claim 7, wherein writing the third RDF data comprises writing a plurality of copies of the third RDF data into the NoSQL database.

* * * * *